United States Patent Office

3,505,027
Patented Apr. 7, 1970

3,505,027
APPARATUS FOR DECOMPOSING AMMONIA
Fritz Breitbach and Gustav Choulat, Recklinghausen, Germany, assignors to Carl Still, Recklinghausen, Westphalia, Germany, a firm of Germany
Original application May 21, 1964, Ser. No. 369,187. Divided and this application June 12, 1967, Ser. No. 679,945
Claims priority, application Germany, May 25, 1963, St 20,652
Int. Cl. F27b 5/00; B01j 6/00, 9/04
U.S. Cl. 23—277                    3 Claims

ABSTRACT OF THE DISCLOSURE

Apparatus for decomposing ammonia comprising a furnace housing having an interior refractory lining surrounding a centrally located combustion chamber and a plurality of first and second passages defined and encompassed by the lining with the passages being circumferentially spaced in alternating sequence on a circular plane coaxial with the furnace housing axis. Means are provided to feed combustion gases generated in said combustion chamber and ammonia-laden gas to the first and second passages respectively so as to provide for thermal decomposition of the ammonia without direct contact with the combustible heating medium.

---

This is a division of application Ser. No. 369,187, filed May 21, 1964 and now abandoned.

This invention generally relates to the processing of ammonia-containing fluids and is particularly directed to an apparatus suitable for the destruction or decomposition of ammonia obtained in the processing of coke oven plants or gas works.

As is generally known in the art, relatively large amounts of ammonia are developed in the operation of coke oven plants and gas works. This ammonia is usually separated from the other products by washing with water. The ammonia is then liberated or expelled from the wash liquor and the ammonia-containing vapor clouds thus obtained are supplied to the poor or weak gas generators for the purpose of decomposing the ammonia. In the subsequent decomposition, the ammonia is decomposed to nitrogen and hydrogen.

This prior art procedure, however, has a serious drawback because the decomposition of the ammonia also results in the formation of significant amounts of nitrogen oxides. In the production of town gas or long distance supplied gas, the poor gas is often times added to the gas emanating from the coke oven plant. Due to the presence of the nitrogen oxides in the poor gas as referred to, the resulting town or long distance gas thus contains relatively high amounts of nitrogen oxides. This, of course, is highly undesired.

Accordingly it is a primary object of this invention to provide for a process and apparatus by means of which the ammonia originally emanating from coke oven plants or gas works is decomposed or destroyed without the formation of nitrogen oxides in the off gases.

According to another object of the invention, the inventive apparatus renders it possible to decompose the ammonia outside the poor gas generators of the prior art and in such a manner that the combustion heat resulting from the decomposition can be fully utilized for gainful purposes and without formation of nitrogen oxides.

Generally it is an object of this invention to improve on the art of processing ammonia-containing fluids for the purpose of decomposing the ammonia contained therein.

Briefly and in accordance with the invention, ammonia originally emanating from coke oven plants and gas works and obtained in the processing of gases derived from the condensates and wash liquors, is decomposed into nitrogen and hydrogen without the formation of nitrogen oxides, by first heating the ammonia-containing vapor clouds to the decomposition temperature of the ammonia and then passing the ammonia at such temperature through a decomposition zone.

The heating of the ammonia clouds to the decomposition temperature is accomplished by the combustion of a heating medium, for example, a gaseous or liquid fuel in the presence of combustion air.

The decomposition zone may be in the form of a free space or chamber or may comprise a chamber which is filled with temperature resistant filling bodies. Further, the decomposition zone may contain catalysts of a suitable nature.

The hydrogen which is formed as a result of the decomposition of the ammonia is completely burned [1] behind the decomposition zone by supplying a secondary air stream. The hot off gases formed in the process are then conducted into a waste heat boiler for the purpose of utilizing the heat thereof, or those off gases may be utilized in any other suitable manner. It is also within the scope of this invention simply to cool the off gases in any desired manner in the event that the utilization of the heat is of no importance.

According to one embodiment of the invention, the ammonia-containing vapor clouds to be decomposed are mixed with the heating medium, e.g., the fuel and/or the combustion air, prior to the combustion of the fuel. In this event and in order to maintain a reducing atmosphere, the amount of combustion air supplied to the mixture should not exceed that quantity which is necessary to effect combustion of the fuel.

However, according to a second embodiment of the invention, it is also feasible to heat the ammonia-containing clouds indirectly by heat exchange, i.e., without any mixing or direct contact with the heating medium.

While it is theoretically possible to perform the combustion of the ammonia vapor clouds in a single step and without decomposition in a reducing atmosphere, experience has shown that such procedure results in the formation of combustion gases which contain significant amounts of undesired nitrogen oxides. For this purpose, the process according to this invention is performed in several separate stages, to wit the ammonia clouds are first heated to the decomposition temperature and the decomposition proper and combustion are effected in two subsequent steps. Heating and decomposition may also be effected in one united stage, the combustion is performed then in a separate step.

The inventive procedure may be facilitated by a number of secondary features. Thus, for example, in some

---

[1] Alone or in mixture with other burnable gases.

instances it may be desired to supply the ammonia clouds to the reactor with as low a content of water (steam) as possible. For this purpose, the vapor clouds, prior to being supplied to the reactor, may be concentrated by multi-stage distillation. In this manner the ammonia content in the clouds will be significantly increased.

For several purposes it is desired that the off gases from the reactor contain but very small amounts of sulfurous acid. To this end the ammonia-containing wash liquor, prior to expelling the ammonia, may be passed in known manner through a deacidifier. In doing so, the hydrogen sulfide vapor clouds formed in this manner and containing small amounts of ammonia are at a suitable point again combined with the crude gas, while the hydrogen sulfide in known manner may be removed from the gas, for example, by dry purification. It is also possible to process the hydrogen sulfide clouds in known manner to form sulphur or sulphuric acid.

According to a further modification of the invention, ammonia-containing liquids emanating from different plants or process stations may be combined and collected and the ammonia may be decomposed in a central plant or decomposition stations and the combustion heat resulting from the decomposition may then be utilized in a suitable manner.

The hot, combustible matter-containing gases which leave the decomposition zone comprise in some instances hydrogen sulfide, dependent on the original composition of the vapor clouds. In such event, these gases are cooled down to a temperature of about 150 to 200° C. However, if these gases are substantially free from hydrogen sulfide, a cooling down to 20–30° C. is advisable. These cooled gases may then be admixed with the crude gases of the gas producing plant, either before or behind the hydrogen sulfide washing stage. In this manner, the calorific value of the coke oven plant or gas works is considerably reduced. The hydrogen which is formed in the decomposition of the ammonia is utilized in the combustion. The water content of the crude gases is not increased in this manner since upon cooling of the gases leaving the decomposition zone as referred to, the major portion of the steam contained in the gases is condensed.

However, according to a different embodiment of the inventive process, it is possible to admix the hot, hydrogen sulfide containing gases which leave the decomposition zone, with hydrogen sulfide containing vapor clouds emanating from a gas washing plant and to burn this mixture in the furnace of a sulphuric acid plant. If this is done, the admixture should take place after the gases emanating from the decomposition zone have been cooled.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
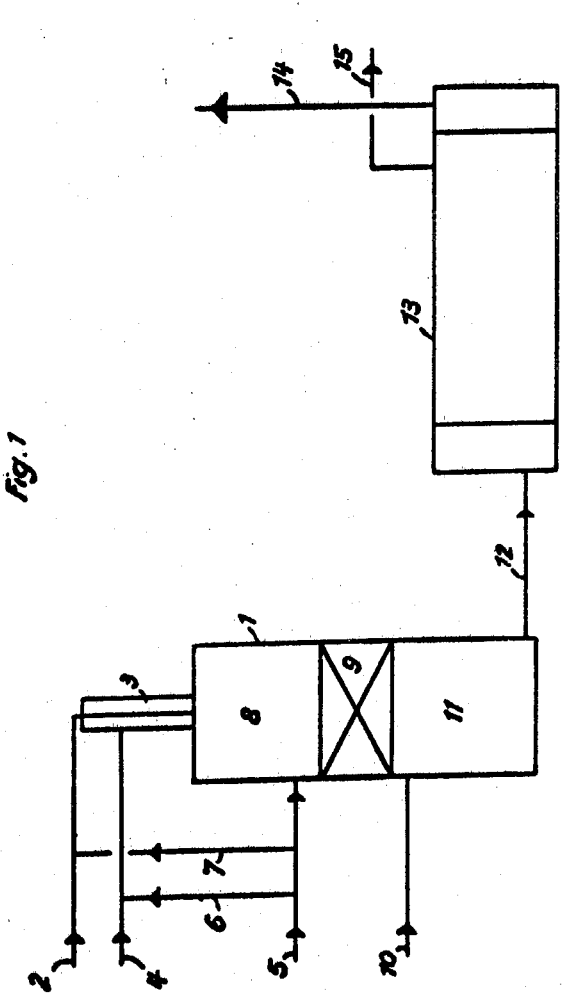
FIG. 1 is a diagrammatic representation of one embodiment of a plant for carrying out the inventive procedure.

Referring first to the diagrammatic representation of FIG. 1, reference numeral 1 indicates schematically a reactor to be heated to the required reaction temperature. For this purpose the reactor 1 is heated by the combustion of a gaseous or liquid fuel which is supplied to a burner 3 through line 2. The combustion air necessary to accomplish combustion of the fuel flowing through line 2 is supplied to the burner 3 through line 4. The amount of combustion air is adjusted so that a reducing atmosphere is produced in the reactor. The ammonia vapor clouds to be decomposed can be supplied to the reactor in different ways. According to one embodiment, these ammonia clouds may be supplied through the line 5 so that they will directly enter the combustion chamber 8 of the reactor 1. According to a second possibility, the ammonia clouds may be supplied jointly with the combustion air through the lines 5, 6 and 4. Further, it is also possible to supply the ammonia clouds jointly with the fuel through the lines 5, 7 and 2. In all these instances, the ammonia clouds are introduced into the chamber 8 of the reactor 1 and are heated to the reduction or decomposition temperature. In the embodiment shown in FIG. 1, there thus occurs actual mixing of the heating medium and the ammonia clouds.

After the ammonia clouds have been heated to the necessary decomposition temperature, they are then, jointly with the steam and the off gases, passed through the decomposition zone 9 for complete decomposition of the ammonia. The zone 9 may be filled with filling bodies or with a suitable catalyst, for example, nickel.

It is possible to accomplish the process by supplying secondary air which through line 10 enters an after-combustion zone 11. This means that any hydrogen which is formed in the decomposition of the ammonia is completely burned up in the after-combustion zone 11 due to the introduction of the secondary air through line 10.

The hot off gases flow subsequently through line 12 to reach the waste heat boiler 13. The off gases are discharged to the atmosphere through the chimney 14. The steam which is produced in the waste heat boiler flows through line 15 to any suitable point of utilization, i.e., it may be supplied to the steam network of the plant. The hot off gases of the after-combustion zone may, of course, also be utilized or cooled in any other suitable manner.

Figure 2:
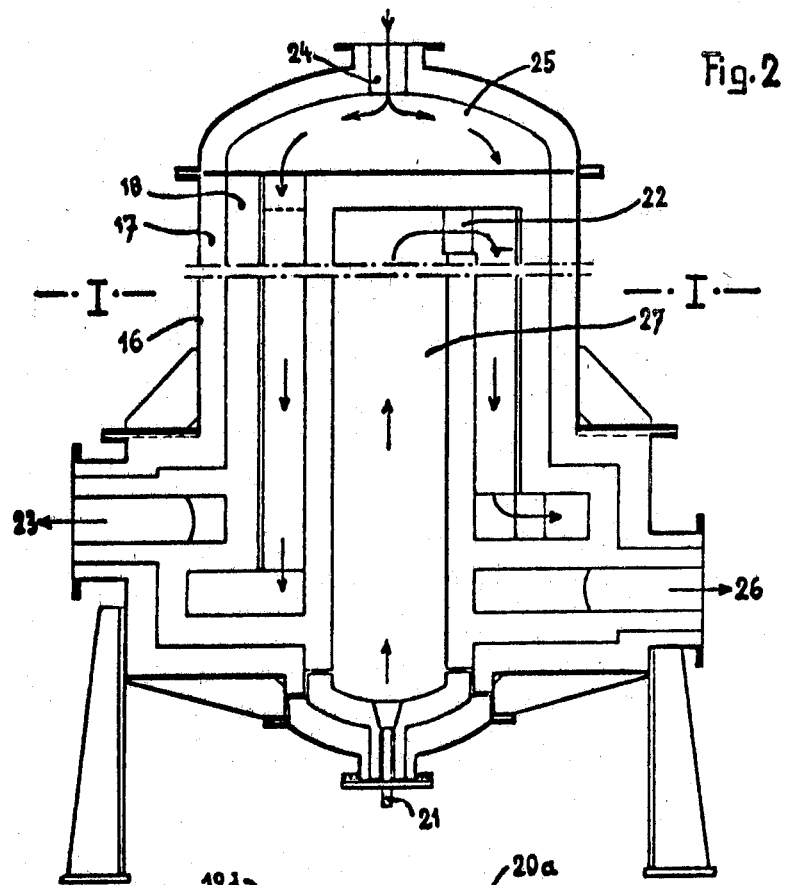
FIG. 2 is a longitudinal axial sectional view of a reactor suitable for carrying out the inventive procedure with that portion to the left of the center line being taken along the line II—II of FIG. 3 while the portion to the right of the center line is taken along the line III—III of FIG. 3.
Figure 3:
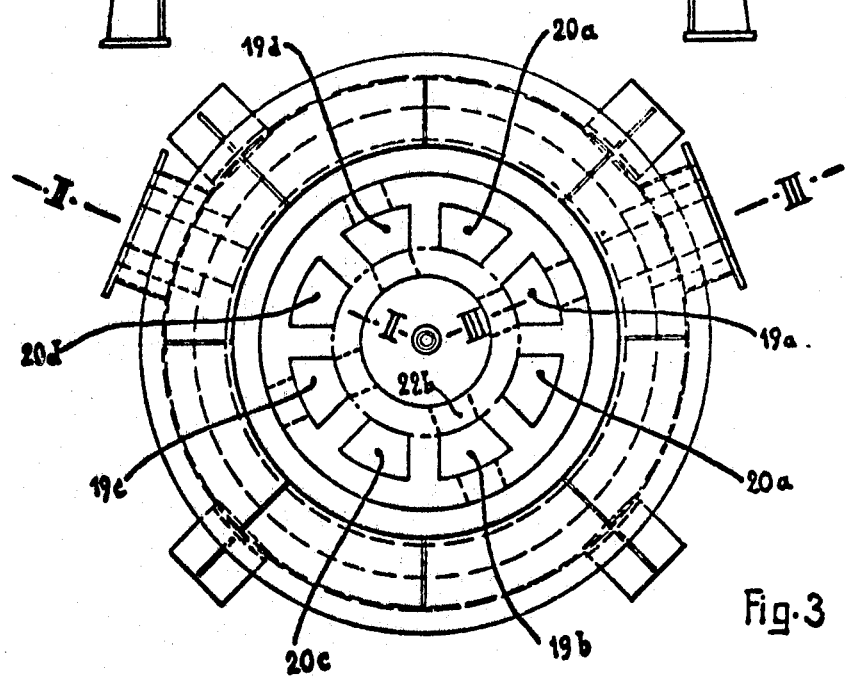
FIG. 3 is a section taken along line I—I of FIG. 2.

FIGS. 2 and 3 show an embodiment for a reactor in which the heating of the ammonia clouds to the decomposition temperature and the decomposition itself are accomplished in an indirect manner, i.e., no mixing of the ammonia clouds with the heating medium takes place. The apparatus shown in FIGS. 2 and 3 essentially consists of a cylindrical refractory furnace which is outwardly insulated. The furnace comprises several circumferentially spaced heating flues or passes and decomposition spaces which are arranged in alternating sequence on the same circle or circles concentric with the axis of the reactor. The furnace also includes a combustion space for the heating agent or gases and moreover has a distributor space for distributing the entering ammonia vapors.

Referring more particularly to the structure shown in FIGS. 2 and 3, it will be noted that the furnace includes an outer cylindrical jacket or shell 16 of iron or the like suitable material. The jacket 16 is lined with an insulating layer 17 for the purpose of heat insulation. A refractory lining 18 is mounted on the heat insulating layer. This refractory lining 18 is provided with a plurality of passages or cutouts which serve as heating flues or passes 19a–19d on the one hand and constitute decomposition spaces 20a–20d for the decomposition of the ammonia clouds on the other hand. It will be noted that the passages 19a–19d and 20a–20d are arranged in alternating sequence on the same circle concentric to the axis of the furnace. The heating gas, that is the fuel and the combustion air, are supplied to the furnace through a burner 21 which is arranged in the lower portion of the furnace and thus enter the central combustion space or chamber 27. The combustion gases which rise through the combustion chamber 27 are deflected in the upper portion of the furnace through slots 22a–22d which establish communication between the chamber 27 and the flues 19a–19d and these combustion gases thus flow through the heating flues 19a–19d downwardly as indicated by the arrows. The combustion gases exit through the discharge openings 23 from where these gases may be conveyed, for example, to a waste heat boiler or any other suitable point for heat utilization. The ammonia vapor clouds to be decomposed are supplied to the top of the furnace through the line 24 arranged in the upper portion of the furnace. The ammonia clouds thus enter the collecting space 25 and are distributed from there to the decomposition spaces 20a–20d communicating with space 25. The decomposition spaces are thus heated by the flow of the combustion gases resulting from the combustion of the fuel and the combustion air to such a temperature that the ammonia clouds within the decomposition spaces are heated to the decomposition temperature and decomposed. The decomposed gases formed in the decomposition spaces exit from the reactor through exit line 26 and may from there be conveyed to a suitable point of utilization. Thus, for example, they may be conducted into the crude gas line of a coke oven plant. It will be noted that the apparatus described does not provide for mixing of the heating gas and the ammonia, but indirect heating of the ammonia clouds is accomplished.

EXAMPLE

Assuming that an aqueous ammonia containing liquor is to be processed which contains 10.9 grams of ammonia, 6.7 grams of hydrogen sulphide and 1.4 grams of $CO_2$ per liter, the decomposition gases which are formed at about 1000° C. will have the following composition, disregarding the water content:

$CO_2$—2.5 vol. percent
$H_2$—73.1 vol. percent
$N_2$—24.4 vol. percent
$H_2S$—227 g./Nm.$^3$

COMPARISON EXAMPLE

The coking of 1000 tons of dry coal results in the formation of 2100 kg. of ammonia. This ammonia may, for example, be contained in 175 m.$^3$ of wash water and condensate. The ammonia is expelled from this liquor in known manner so that the ammonia clouds formed contain about 250 kg. of ammonia and 750 kg. of steam, in addition to the other customarily accompanying substances. These ammonia clouds are supplied to the reactor 1 through line 5 as shown in FIG. 1. 2600 Nm.$^3$ (atmospheric pressure) of coke oven gas are supplied through line 2 while 12,100 Nm.$^3$ of air are introduced through line 4. The coke gas amount is adjusted in such a manner that the heat resulting from its combustion is utilized for the decomposition of the ammonia into nitrogen and hydrogen and that the gas mixture which exits from the decomposition zone has a temperature of about 1000° C. This hot mixture enters into the after-combustion zone 11 into which are supplied about 12,800 Nm.$^3$ air through line 10.

After the combustion of the hydrogen which has been formed as a result of the ammonia splitting, the combustion gases leave the after-combustion zone 11 through line 12 and enter the waste heat boiler 13. 40,000 kg. of steam are obtained which are discharged from the waste heat boiler through line 15.

The off gases which leave through the chimney 14 do not contain any significant amounts of nitrogen oxides.

If, by contrast, ammonia clouds are supplied to an ordinary prior art combustion furnace where the clouds are burned up in a single stage with the same coking gas amount and in the presence of 25,0000 Nm.$^3$ of air, so that nitrogen and water is formed from the ammonia, an off gas leaves the chimney which contains up to 4.8 grams of nitrogen oxides per Nm.$^3$. By contrast, according to the present invention as previously stated, only the fuel is burned at the beginning and the hot mixture to be decomposed is conveyed first to a decomposition zone and subsequently, under admixtures of additional combustion air, into an after combustion chamber where the hydrogen is completely burned up so that an off gas is obtained which does not contain any nitrogen oxides.

While specific embodiments of the invention have been shown and described in detail to illustrate the application of the inventive principles, it will be understood that the invention may be embodied otherwise without departing from such principles.

What is claimed is:

1. Apparatus for decomposing the ammonia of ammonia-containing vapor clouds, comprising:
   (a) a substantially cylindrical, outwardly insulated furnace housing,
   (b) said housing having an interior, refractory lining surrounding a substantially centrally located combustion chamber,
   (c) a plurality of first and second passages defined and encompassed by said refractory lining,
   (d) said first and second passages being circumferentially spaced in alternating sequence on at least one circular plane coaxial with the axis of said cylindrical furnace housing,
   (e) inlet means communicating with said combustion chamber for supplying a combustible heating medium to said combustion chamber,
   (f) conduit means establishing communication between said combustion chamber and said first passages, said first passages serving as heating flues for combustion gases formed in said combustion chamber,
   (g) exit means communicating with said heating flue passages for discharging combustion gas therethrough,
   (h) means for introducing ammonia vapor clouds into said second passages, said second passages serving as heating and decomposition spaces for the ammonia clouds, and
   (i) means for discharging gases from said decomposition spaces.

2. Apparatus as claimed in claim 1, wherein said means (h) comprises an inlet conduit adjacent the top of said furnace housing and a distributor chamber defined within said housing and communicating with said inlet conduit and said decomposition spaces.

3. Apparatus for decomposing the ammonia of ammonia-containing vapor clouds, comprising in combination:
   (a) a substantially cylindrical, outwardly insulated furnace housing,
   (b) said housing having an interior, refractory lining surrounding a substantially centrally located combustion chamber,
   (c) a plurality of first and second passages defined and encompassed by said refractory lining,
   (d) said first and second passages being circumferentially spaced in alternating sequence on at least one circular plane coaxial with the axis of said cylindrical furnace housing,
   (e) inlet means communicating with the lower portion of said combustion chamber for supplying a combustible heating medium to said combustion chamber,
   (f) conduit means establishing communication between said combustion chamber and said first passages, said first passages serving as heating flues for combustion gases formed in said combustion chamber,
   (g) exit means communicating with said heating flue passages for discharging combustion gas therethrough,
   (h) said housing forming a distributor chamber at the top thereof, said distributor chamber communicating with an inlet conduit for supplying ammonia vapor clouds to said distributor chamber, said distributor chamber communicating with said second passages serving as decomposition spaces,
   (i) means for igniting said combustible heating medium in said combustion chamber, (j) said decomposition spaces communicating with a combustion chamber, and
(k) means in the combustion chamber for burning combustible matter formed in said decomposition spaces.

References Cited

UNITED STATES PATENTS

| | | | |
|---|---|---|---|
| 2,013,809 | 9/1935 | Salisbury | 23—277 |
| 2,500,499 | 3/1950 | Schuurman | 23—277 X |
| 3,000,693 | 9/1961 | Schulte | 23—2 |
| 3,020,138 | 2/1962 | Wethly | 23—3 X |

MORRIS O. WOLK, Primary Examiner

B. S. RICHMAN, Assistant Examiner

U.S. Cl. X.R.

23—2, 212, 220, 284; 122—235